July 8, 1952            J. D. DITSON            2,602,365

COLLAR

Filed Dec. 18, 1948

INVENTOR
J. D. DITSON.
BY *Cady*
HIS ATTORNEY.

Patented July 8, 1952

2,602,365

UNITED STATES PATENT OFFICE 2,602,365

COLLAR

J. D. Ditson, Phillipsburg, N. J., assignor to Ingersoll-Rand Company, New York, N. Y., a corporation of New Jersey Application December 18, 1948, Serial No. 66,001

6 Claims. (Cl. 85—50)

1

This invention relates to collars and more particularly to composite collars which are adapted to be mounted on members having threaded and smooth portions—as for example, the feed screw of a rock drill.

One disadvantage normally associated with collars of known types is that, generally, in order to mount the collar on the member to which it is adapted, it is necessary to slip the collar over the smaller end of said member and slide the collar along the member until it abuts a portion of the member having a larger diameter or width than the opening in the collar. Such an arrangement is highly unsatisfactory under circumstances wherein the smaller end of said member is secured to some object from which it must be disengaged in order to mount or remove the collar from the member. As for example, in the previously mentioned feed screw arrangement, it would be necessary to disassemble the feed screw from the feed motor in order to remove a collar encircling the smooth portion of said screw between the motor and the screw threads because the effective or major diameter of the threaded portion exceeds that of the smooth portion. This disadvantage has been overcome to some extent by the use of split collars but here too, several disadvantages exist, such as loss of strength and the need for some means to hold the collar together.

It is, accordingly, one object of this invention to provide a collar which may be passed over or along a portion of the member to which it is adapted, of greater diameter than that portion of said member which the collar encircles in its operative position and which is held in this position against longitudinal movement along the member by virtue of said greater diameter.

Figure 1:
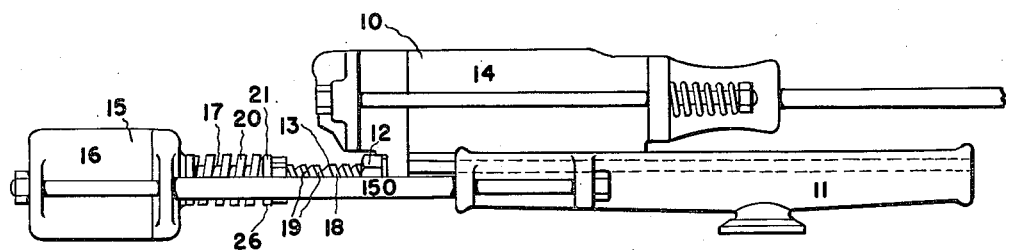
Figure 2:
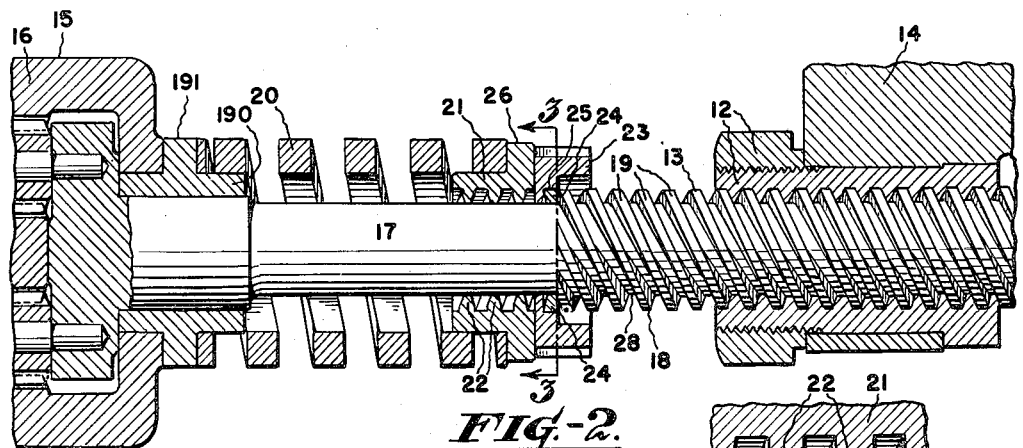
Figure 6:
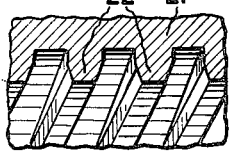
Figure 3:
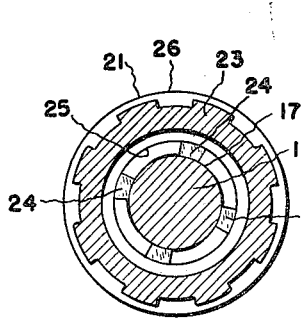
Figure 4:
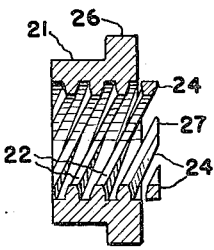
Figure 5:
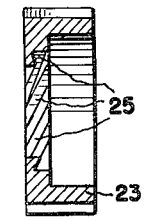

Other objects will become obvious in the following specification and accompanying drawing in which, Figure 1 is a side view of a mounted rock drill of the drifter type, Fig. 2 is a longitudinal elevation, partly in section, of the feed nut-feed screw arrangement utilized to impart longitudinal movement to the rock drill and to which is adapted a preferred form of the present invention, Fig. 3 is a transverse view taken through Figure 2 along the line 3—3 looking in the direction of the arrows, Fig. 4 is a cut away view of one of the members of the composite collar, Fig. 5 is a cut away view of the other member of the composite collar, and Fig. 6 is an enlarged detail of Figure 4.

Referring to the drawings and more particularly to Figure 1, a rock drill 10 of the drifter type is shown slidably mounted on a shell or support 11 and driven therealong by a conventional feed nut-feed screw arrangement in which the feed nut 12 is clamped to the rock drill casing 14 and longitudinal movement is imparted to the rock drill by the rotary movement of the feed screw 13 in the nut 12. In furtherance to this end, the feed screw 13 is driven by a feed motor 15 mounted on member 150 extending rearwardly of and supported by the shell 11.

In order to prevent the rock drill 10 from striking the casing 16 of the feed motor 15 in the event the feed motor is left running when the drill is moving in a rearwardly direction (to the left as viewed in Figure 1), a buffer arrangement is interposed between the rock drill 10 and the feed motor 15. Accordingly, the rearward end portion 17 of the feed screw 13 is smooth and is of less diameter than the effective, or major, diameter of the threaded portion 18—in the present showing, the diameter of the smooth portion 17 is equal to the minor, or root, diameter of the threaded portion 18. A relatively heavy spring 20 having an internal diameter which exceeds the major diameter of the threaded portion 18, encircles the smooth portion 17 of the feed screw 13 and is positioned between a sleeve 190, encircling the screw 13 where it enters the feed motor casing 16, and a composite collar slidably mounted on the screw 13 and abutting the rearward ends of the threads 19.

In this manner, the rearward movement of the rock drill 10 is halted gradually by the spring 20 which is compressed until the resistive force of the spring stalls the feed motor 15. The sleeve 190 is arranged to bear against the internal rotating parts of the motor 15 so that the thrust force against the sleeve 190, resulting from such compression, is transmitted through the rotating parts of the motor 15 to a suitable thrust bearing (not shown) therein. The strength of the spring 20 is such that the motor 15 stalls before the spring 20 is completely compressed and before the feed nut 12 becomes unthreaded from the feed screw 13.

In accordance with the objects of the invention, the composite collar may be assembled on the threaded end of the feed screw 13 and is, accordingly, adapted to receive the threads 19 of the feed screw 13. In the preferred form of the invention as shown, the collar comprises a threaded body or support nut 21 provided with a means, such as the threads 24, forming a continuation of internal threads 22, of the nut 21, and which are adapted to form a continuation of the external threads 19 of the feed screw 13. The means, or threads, 24 are similar in shape to the internal threads 22 and, hence, are slidable in the grooves formed between the threads 19 on the feed screw 13 so that the nut 21 can be threaded thereon. A second threaded body or lock nut 23 is provided which is adapted to receive the threads 19 or the threads 24 which extend beyond the body of the support nut 21. Thus, the threads 24 serve as internal threads for the support nut 21 and as external threads for the lock nut 23 threaded thereon. In order to accomplish the threading of the lock nut 23 on the extended threads 24, if a square thread is not used, it is necessary to machine the grooves 25 in the lock nut 23 (see Figure 6) so that it is adapted to receive the threads 24. Of course machining the threads 24 to conform with the grooves 25 would also be satisfactory.

The uniqueness of this collar arrangement and the advantages associated therewith are more readily appreciated when the manner in which the collar is adapted to the threaded member or feed screw 13 is described. In the present showing, after the spring 20 is passed over the feed screw 13, the support nut 21 is threaded along the feed screw 13 from the forward end thereof until it encircles the smooth portion 17 in which position the spring 20 at one end abuts an external flange 26 on the nut 21 and the other end is pressed against a flange 191 on the sleeve 190. The extended threads 24 are then aligned with, and form a continuation of, the threads 19 of the feed screw 13 and the lock nut 23 is threaded along feed screw 13 from its forward end and onto the extended threads 24.

The length of the extended threads 24 are substantially equal to the length of the threaded portion of the lock nut 23 so that when the lock nut 23 is threaded on and firmly abuts the support nut 21, the effective opening in the lock nut 23 has been reduced and it, in substance, becomes an unthreaded collar. That is, slight rotation of the collar assembly misaligns the extended threads 24 with respect to the threads 19 on the feed screw 13 and the tips or points of the threads 24 lock in the grooves 28 between the threads 19, thus the lock nut 23 can not back off onto the threads 19, nor can, of course, the nut 21.

It is to be understood that the amount that the tips of the threads 24 extend beyond the nut 23 when it is threaded on the nut 21, is sufficient only to lock the collar against reverse rotation with respect to the feed screw, and these tips which extend into the grooves 28 do not support the collar arrangement to transmit force from the spring 20 to the threaded portion 13. In furtherance to this end, the outer ends of the extended threads 24 are tapered slightly, as indicated at 27, to cooperate with the ends of the threads of the lock nut 23, thereby a substantially solid or continuous surface abuts the rearward ends of the threads 19 on the feed screw 13.

With this arrangement, it will be noted, not only can the spring 20 be replaced because of fracture or other failure without dismantling the feed screw 13 from the feed motor 15, but also greater freedom of design is available for the end portion of the feed screw which is secured to the motor casing 16—that is, it is not necessary to restrict the maximum diameter of this portion of the feed screw to something less than the major diameter of the feed screw.

It is obvious from the previous discussion that a collar constructed in accordance with the practice of the invention, accomplishes, among others, the objects hereinbefore stated and, further, provides several distinct advantages over collars of previously known construction—as for example, those advantages pointed out as resulting from the use of the collar in connection with the buffer assembly of a rock drill.

While I have shown and described a specific form of my invention, it is to be understood that various changes and modifications may be made without departing from the spirit of the invention as set forth in the appended claims.

I claim:

1. A collar for a member having a thread and a portion of different diameter than the major diameter of the member at the thread comprising, a body slidably mounted on the member at said portion and adapted to receive said thread and having a thread forming a continuation of the first said thread, and a nut threaded on the last said thread.

2. A collar for a member having an external thread and a smooth portion comprising, a body slidable on said smooth portion and adapted to receive said external thread and having an internal thread, a thread supported by said body and forming a continuation of said internal thread and adapted to form a continuation of said external thread, and a nut threaded on the last said thread.

3. A collar comprising, a body having a spiral thread, a thread forming a continuation of the first said thread and extending beyond said body, and a nut threaded on the second said thread.

4. A collar for a member having a threaded portion and a smooth portion comprising, a body having a spiral groove adapted to thread on the threaded portion and slidably mounted on said smooth portion, a second body having a spiral groove adapted to thread on said threaded portion and slidably mounted on said smooth portion, and means mounted on one of said bodies adapted to form a continuation of said threaded portion and threaded in the groove of the other of said bodies for preventing movement of said bodies relative to each other and to prevent said bodies from threading onto said threaded portion.

5. The combination with a member having an externally threaded portion, a smooth portion on said member having a diameter less than the major diameter of the threaded portion, of a support nut having an internal thread adapted to be threaded on said threaded portion, a thread integral with and forming a continuation of said internal thread and adapted to form a continuation of said threaded portion when said nut encircles said smooth portion, and an internally threaded lock nut threaded on said thread forming a continuation of the internal thread.

6. A collar for a member having a smooth portion and an adjacent portion having external spiral grooves comprising, a body slidable on said member and encircling said smooth portion, means on said body slidable in said grooves and extending longitudinally beyond said body, and a second body adapted to receive said grooved portion and mounted on said means for preventing sliding movement of said means in the external grooves.

J. D. DITSON.

REFERENCES CITED

The following references are of record in the file of this patent:

UNITED STATES PATENTS

| Number | Name | Date |
|---|---|---|
| 1,077,119 | Bixby | Oct. 28, 1913 |
| 2,089,168 | Brown | Aug. 3, 1937 |